Sept. 29, 1964 W. P. SAGE 3,150,555
BEATER FOR DRUMS
Filed Dec. 26, 1962
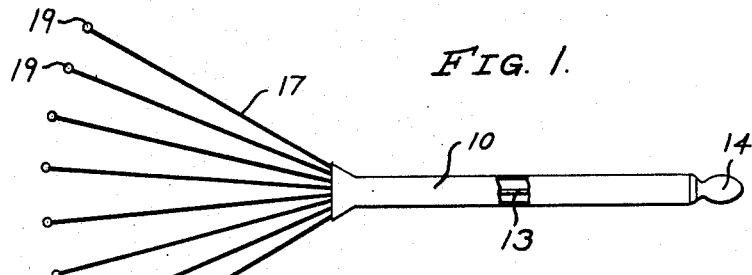
FIG. 1.
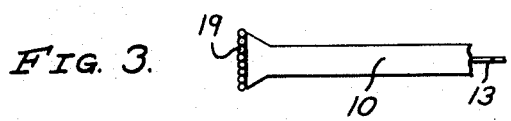
FIG. 3.
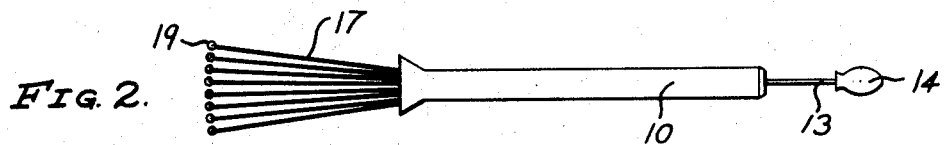
FIG. 2.
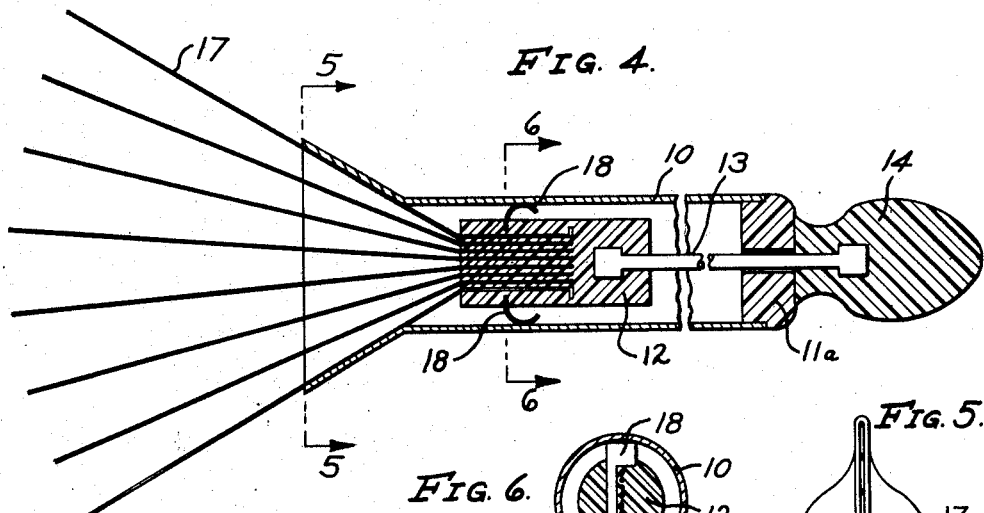
FIG. 4.
FIG. 6.
FIG. 5.
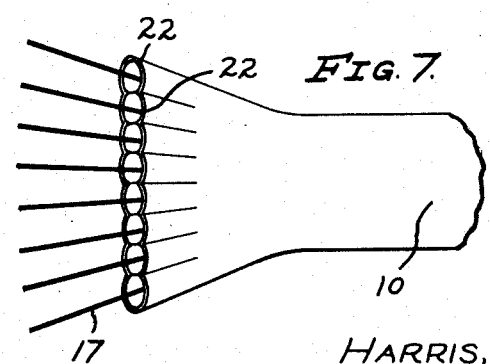
FIG. 7.
INVENTOR.
WALTER P. SAGE
BY HIS ATTORNEYS
HARRIS, KIECH, RUSSELL & KERN 3,150,555
BEATER FOR DRUMS
Walter P. Sage, 14342 Albers St., Van Nuys, Calif.
Filed Dec. 26, 1962, Ser. No. 246,918
7 Claims. (Cl. 84—422)

This invention relates to a new and novel beater for drums, cymbals and the like and, in particular, to a new and novel ball fan beater providing some accoustical characteristics similar to wire brushes, some characteristics similar to drumsticks, and some new characteristics.

It is an object of the invention to provide a new drum beater including a plurality of flexible members such as wires carried by and fanning outward from a handle with the flexible members terminating in beater balls having the form of an enlarged mass at the free end of each member. Typically a beater will include about eight steel wires, each about ten-thousandths of an inch in diameter and eight inches long with each wire carrying a one-sixteenth inch diameter ball at the end.

It is a particular object of the invention to provide a drum beater incorporating a handle, a plurality of elongate flexible beater carriers carried at an end of the handle and disposed in diverging relation with each other, and a beater for each of the carriers, with each beater comprising a ball-like solid body fixed at the free end of the carrier.

It is a further object of the invention to provide such a beater in which the ball carriers or wires are mounted in a block slidable within a tubular handle providing for extending and retracting the beater balls from the handle.

It is a particular object of the invention to provide such a drum beater including a relatively rigid handle and a relatively flexible cap providing for various types of effects with a single device, the flexible wires and balls providing the ball fan sound, the resilient cap providing a mallet sound, and the rigid handle providing a percussive or stick-type sound.

The invention also comprises novel details of construction together with other objects, advantages, features and results, which will more fully appear in the course of the following description. The drawing merely shows and the description merely describes preferred embodiments of the present invention which are given by way of illustration or example.

In the drawing:

FIG. 1 is a plan view of a preferred form of the beater with the ball fan fully extended;

FIG. 2 is a view similar to that of FIG. 1 with the ball fan partially extended;

FIG. 3 is a partial view similar to that of FIG. 1 with the ball fan fully retracted;

FIG. 4 is an enlarged partial sectional view of the device of FIG. 1;

FIG. 5 is a sectional view taken along the line 5—5 of FIG. 4;

FIG. 6 is a sectional view taken along the line 6—6 of FIG. 4; and

FIG. 7 is a perspective view showing an alternative form for the tube end.

The preferred form of drum beater illustrated in the drawing includes a handle in the form of a tube 10 which is normally of circular cross section but may be elliptical, rectangular, etc. The tube is relatively rigid and typically may be a length of metal tube about three-eighths inch in diameter and eight inches long. One end of the tube preferably is flattened to provide a slit-like opening 11 and a fan-shaped transition from the tubular body portion to the slit opening, as best seen in FIG. 4. The other end is preferably closed with a bushing 11a.

A sliding unit including a block 12, a push rod 13 and a cap or tip 14 is carried within the tube 10. A plurality of wires 17 is carried in the block 12 for projecting through the end of the tube. A spring member 18 is also carried by the block 12. Typically the block may be a cast plastic with the wires 17, the spring member 18, and a flattened end of the push rod 13 embedded therein. The spring member 18 resiliently engages the inner wall of the tube 10 and serves to maintain the sliding unit in a set position relative to the handle. The tip 14 may also be a cast member, preferably of a relatively resilient material such as natural rubber, silicone rubber or nylon, in the form of a drumstick tip. Alternatively the push rod may be terminated at the tip and in a loop or ring providing means for hanging the beater on a hook.

The wires 17, which serve as resilient carriers for beater balls 19 at the ends of the wires, are made of metal, plastic or the like and may be round, ribbon-shaped or tubular. Typically a wire may be ten-thousandths of an inch diameter steel and about eight inches long. The particular beater illustrated herein utilizes eight such wires with the preferred range being from six to twelve wires. The beater balls 19 are solid ball-like bodies affixed to the ends of the wires. The balls may take various forms, typically being cast-in-place metal or hard plastic bodies of approximately spherical shape. Preferably the wires 17 will be formed with a burr or turned-up end to provide a better grip for the balls. For certain sound effects, it may be desirable to sand blast the balls after casting to provide a uniform rough surface.

The beater is ordinarily used in the position shown in FIG. 1, with the balls fully extended. The balls may be partially retracted to the position shown in FIG. 2 by moving the tip 14 to the right to provide a stiffer instrument. The balls are normally fully retratced as shown in FIG. 3 for storage.

The ball fan drum beater provides a sound different from those obtained with a conventional drumstick and a conventional wire brush. The beater is particularly well adapted for brush-type playing with large bands and in noisy rooms. The beater may be used with percussive or stick-type playing to provide an entirely different sound.

The ball fan beater is used with cymbals resulting in a sound not like that produced by sticks or wire brushes. In one particular mode of use, the fan is disposed in a vertical plane with the edge of the cymbal placed between an upper and a lower group of balls. A vertical playing motion produces a rapid staccato impact equivalent to playing an extended series of sixty-fourth notes. As is often the case with music, language is not available for describing the distinctive sounds produced with the ball fan beater. However, a demonstration by an experienced drummer immediately establishes the novel effects achievable.

The particular beater described herein permits the drummer to achieve other sounds in addition to the novel ball fan sound with the single device. The beater may be reversed and the relatively resilient tip 14 used as a mallet. Also, with the balls fully retracted as shown in FIG. 3, the handle itself may be used to provide the percussive sound of a drumstick.

An alternative construction for the beater end of the tube 10 is shown in FIG. 7. The end is flattened to provide a flare and flutes 22 are found in the flat sides. This fluted end may be formed directly in the tube 10 or may be formed in a separate piece which is then affixed to the tube. The fluted structure serves to fan out the wires 17 and maintain the fan shape for various amounts of extension. It also provides a receptacle permitting the beater balls to be fully retracted into the tube end.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a drum beater, the combination of:
an elongate rigid handle adapted for manual grasping and manipulation;
a plurality of elongate flexible beater carriers carried at an end of said handle and disposed in diverging relation with each other; and
a beater for each of said carriers, each beater comprising a ball-like solid body fixed at the free end of the carrier.

2. In a drum beater, the combination of:
a tubular handle adapted for manual grasping and manipulation;
a block slidable within said handle;
a plurality of flexible wires mounted in said block for projecting from an end of said handle;
a beater for each of said wires, each beater comprising a ball-like solid body fixed at the free end of the wire; and
means for moving said block within said handle from a retracted position with said wires substantially entirely within said handle to an extended position with said wires projecting from said handle.

3. In a drum beater, the combination of:
a tubular handle adapted for manual grasping and manipulation;
a block slidable within said handle;
a plurality of flexible wires mounted in said block for projecting from an end of said handle;
a beater for each of said wires, each beater comprising a ball-like solid body fixed at the free end of the wire;
means for moving said block within said handle from a retracted position with said wires substantially entirely within said handle to an extended position with said wires projecting from said handle; and
a spring member carried on said block and resiliently engaging the inner wall of said handle for maintaining said block in a set location relative to said handle.

4. In a drum beater, the combination of:
a tubular handle adapted for manual grasping and manipulation and having an end flattened to a slit-like opening;
a block slidable within said handle;
a plurality of flexible wires mounted in said block for projecting from said end of said handle in a divergent pattern;
a beater for each of said wires, each beater comprising a ball-like solid body fixed at the free end of the wire; and
means for moving said block within said handle from a first position with said wires substantially entirely within said handle to a second position with said wires fanning outward from said handle.

5. In a drum beater, the combination of:
a tubular handle having a flared fluted end;
a block slidable within said handle;
a plurality of flexible wires mounted in said block for projecting from said end of said handle in a divergent pattern defined by the fluted flare;
a beater for each of said wires, each beater comprising a ball-like solid body fixed at the free end of the wire; and
means for moving said block within said handle from a first position with said wires substantially entirely within said handle to a second position with said wires fanning outward from said handle.

6. In a drum beater, the combination of:
a relatively rigid tubular handle having an end flattened to a slit-like opening;
a block slidable within said handle adapted for manual grasping and manipulation and;
a plurality of wires mounted in said block for projecting from said end;
a beater for each of said wires, each beater comprising a ball-like solid body fixed at the free end of the wire;
a cap for relatively resilient material for closing the other end of said handle; and
a push rod interconnecting said block and cap;
with said block movable within said handle from a first position with said wires substantially entirely within said handle to a second position with said wires fanning outward through said slit and said cap engaging said other end.

7. In a ball fan beater for drums, cymbals and the like, the combination of:
an elongate rigid handle adapted for manual grasping and manipulation;
a plurality of flexible wires projecting from said handle; and
a beater ball in the form of an enlarged mass at the free end of each of said wires.

References Cited in the file of this patent

UNITED STATES PATENTS

| | | |
|---|---|---|
| 398,176 | Oerlein | Feb. 19, 1889 |
| 479,636 | Droop | July 26, 1892 |
| 1,761,245 | Vitto | June 3, 1930 |
| 2,728,257 | Pochobradsky | Dec. 27, 1955 |

UNITED STATES PATENT OFFICE
CERTIFICATE OF CORRECTION

Patent No. 3,150,555                 September 29, 1964

Walter P. Sage

It is hereby certified that error appears in the above numbered patent requiring correction and that the said Letters Patent should read as corrected below.

Column 2, line 33, for "retratced" read -- retracted --; column 4, lines 21 and 22, strike out "adapted for manual grasping and manipulation and" and insert the same after "handle" in line 19, same column 4; same column 4, line 28, for "for", first occurrence, read -- of --.

Signed and sealed this 6th day of April 1965.

(SEAL)
Attest:

ERNEST W. SWIDER                          EDWARD J. BRENNER
Attesting Officer                             Commissioner of Patents